F. V. WALSH & C. M. REED.
PHOTO ENGRAVING CAMERA.
APPLICATION FILED SEPT. 1, 1914.
1,162,956.
Patented Dec. 7, 1915.
2 SHEETS—SHEET 2.
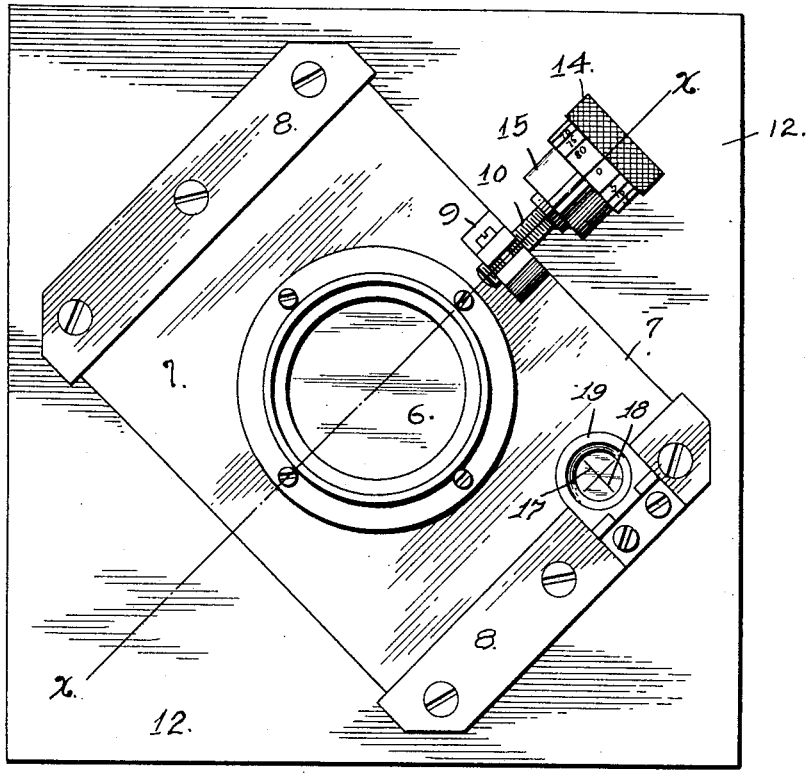
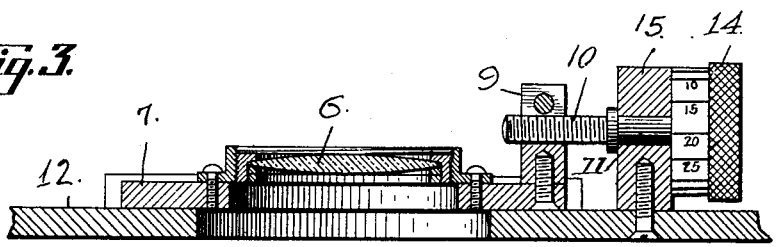

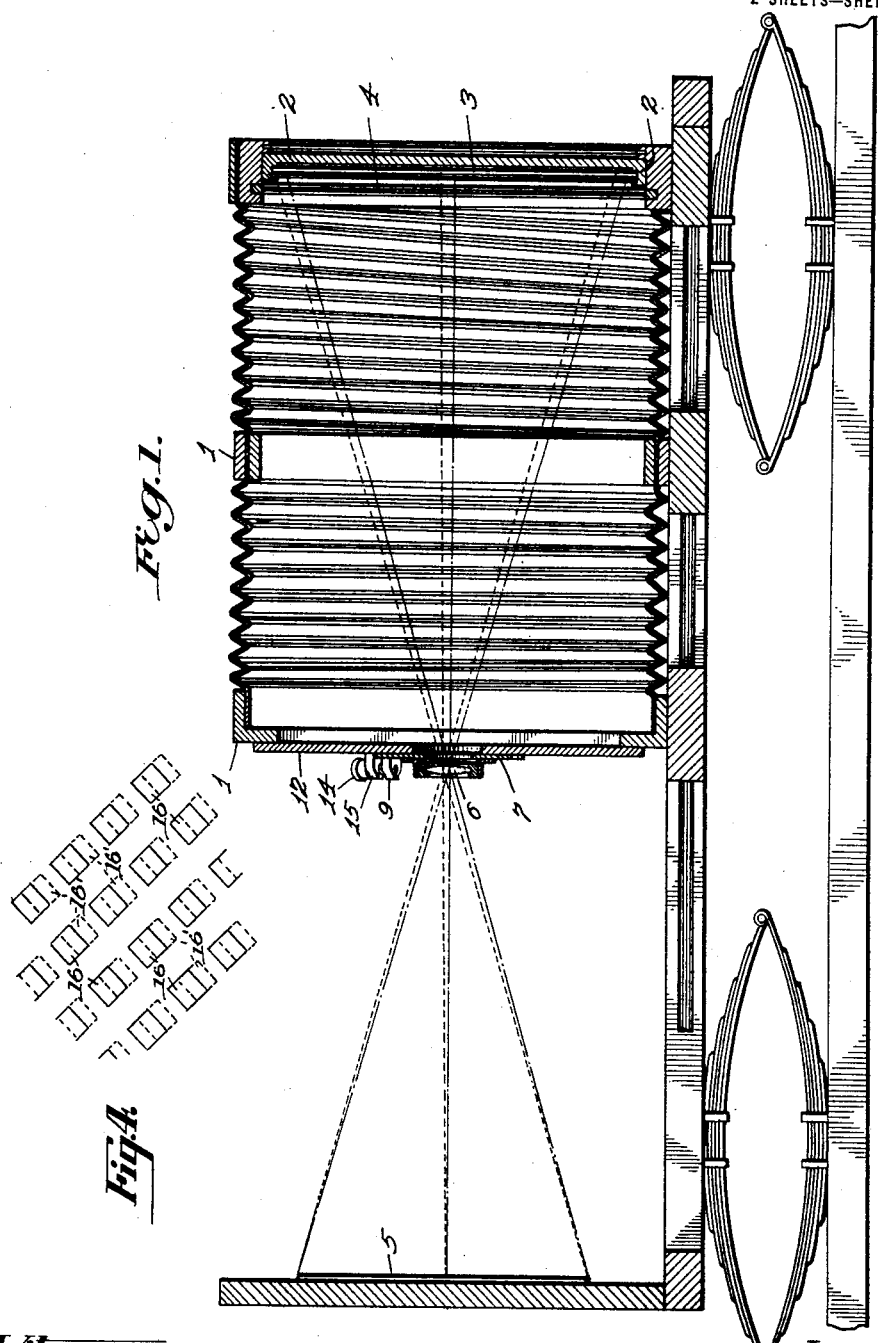

UNITED STATES PATENT OFFICE.

FLETCHER V. WALSH AND COLVIN M. REED, OF SAN FRANCISCO, CALIFORNIA.

PHOTO-ENGRAVING CAMERA.

1,162,956.     Specification of Letters Patent.     Patented Dec. 7, 1915.

Application filed September 1, 1914. Serial No. 860,111.

*To all whom it may concern:*

Be it known that we, FLETCHER V. WALSH and COLVIN M. REED, citizens of the United States, residing in the city and county of San Francisco and State of California, have invented a new and useful Improvement in Photo-Engraving Cameras, of which the following is a specification.

Our invention relates to photo-engraving cameras for the production of photo-engraved color printing plates wherein the lens is made movable for the purpose of shifting the projection of the subject onto the successive sensitive plate through one screen in such a manner that the resulting dots or lines on one finished plate will uniformly overlap all of the dots or lines on every other plate of the series; and the objects of our invention are, first, to provide a camera that will produce a series of finished plates wherein the dots or lines on one plate will uniformly overlap all of the dots or lines on every other plate of the series; second, to produce a series of color records or negatives through one screen; third, to provide means whereby a greater number of negatives or color records may be used; fourth, to provide means whereby the "moire antique" or pattern occasioned by the cross lines of separate plates will be entirely eliminated; and fifth, to provide means for producing color records or negatives from which a more artistic and true reproduction of the subject may be obtained. We accomplish these several features by means of the device disclosed in the drawings forming a part of the present specification wherein like characters of reference are used to designate similar parts throughout the said specification and drawings and in which—

Figure 1 is a vertical longitudinal sectional view of a photo-engraving camera disclosing the screen in position, the plate behind the screen, and the movable lens slidably mounted upon the front of the camera the dotted, and the dot and dash lines indicating the first and second positions of the projected subject. Fig. 2 is a front elevation of the front end of the camera disclosing the lens slidably mounted therein and the means whereby the said lens is shifted. Fig. 3 is a sectional view taken on line X—X of Fig. 2 of the drawings. Fig. 4 is a greatly enlarged diagrammatic view of the dots resulting from the present invention wherein is shown the manner in which the dots of one plate, shown in full lines, are uniformly overlapped by the dots, indicated in dotted lines, of a second plate.

One of the most important characteristics of the process for producing colored photo-engraved printing plates is that the dots on the said plates shall bear the same relative position to each other on the finished printed picture in order to produce a uniform graduation of shades and tints without producing what is known as a "moire antique" result, or pattern.

The present invention entirely eliminates the moire antique results, thereby allowing a greater number of color records, and consequently, a more artistic and faithful reproduction of the original subject. The present invention also provides a means whereby a number of color records or plates may be produced through the same screen without turning the lines thereon, or the screen itself.

Instead of using different screens having the inclined lines thereon at different angles for each separate sensitive plate, if the same screen is used but shifted on a line parallel with one set of lines on the said screen each time a separate sensitive plate is exposed, it is evident that when the plates made from the negatives are developed and inked and impressed upon a sheet of paper that the dots printed from one plate will overlap the dots printed from the other plates in proportion to the amount that the screen was shifted. In other words, instead of changing the relative positions of the dots for each plate by turning the screen a more uniform relation of the dots is obtained by shifting the screen on a line parallel with the lines thereon, which will give the effect disclosed in Fig. 4 of the drawings.

As it is not deemed practical to shift the screen we have provided means for producing the same result which consists in shifting the lens on the camera which is accomplished in the following manner: Referring to the drawings the numeral 1 is used to designate a photo-engraving camera of the usual type and 2 is a plate holder mounted within the back thereof. The sensitive plate 3 to be exposed is placed within the plate holder 2 and back of the screen 4. The subject 5 is projected through the lens 6, in the front end of the camera 1, and the screen 4 onto the sensitive plate 3. The lens 6 is mounted upon a plate 7 which is slidably mounted within the diagonally disposed guides 8 secured to the front 12 of the camera 1. The plate 7 is provided with a lug 9 arranged to engage the threaded portion 10 of a stem 11 rotatably mounted within a standard 15 secured to the front 12 of the camera 1. The stem 11 is provided with a suitable knob 14 having suitable graduations 13 thereon by means of which the amount of rotation of the knob 14 and stem 11 may be indicated. The central or normal position of the lens 6 is indicated by means of a mark 17 on one edge of the plate 7 which registers with a similar mark 18 on the adjacent edge of the guide 8 on that side of the said plate 7. The registration of the mark 17 with the mark 18 is facilitated by means of a small magnifying glass 19 mounted upon the guide 8 and directly over the said mark 18.

In producing the successive negatives, one for each color, the first sensitive plate is placed in the camera 1 and exposed in the usual manner, through the proper filter, not shown, for the color to be registered. The first sensitive plate is then removed and a second sensitive plate, and appropriate filter, is placed in position. Instead of moving the screen 4 in a line parallel with one set of lines on the said screen, the image is slightly shifted by turning the knob 14 the desired amount which will shift the plate 7 and the lens 6 therein. The second sensitive plate is then exposed, through an appropriate filter. Each time a successive sensitive plate is exposed the lens 6 is shifted so that the resulting dots will each lie in a different position on each different negative. While the lens 6 is shifted before each successive sensitive plate is exposed so that the dots on any two plates will not register, it must be understood that the said dots on one plate will always bear the same relative position to the dots on every other plate in the series.

In Fig. 4 of the drawings we have illustrated the relative positions of the dots resulting from one plate to the dots resulting from another plate or negative.

It is obvious from the foregoing that we have provided an improved photo-engraving camera adapted to produce color records wherein the resulting dots or lines on each finished plate will uniformly overlap the dots or lines on every other plate of the series, also an improved camera adapted to produce plates having an absolute lack of "moire antique" or pattern.

It is also obvious that we have provided an improved camera of the character described wherein a greater number of plates or color records may be produced through one screen instead of utilizing a number of screens as in the present state of the art.

It is also obvious that the direction of inclination or the angle at which the projection or lens is shifted is immaterial if the lens or projection is shifted in a line parallel with one set of lines on the screen.

It is also evident that the lens may be stationary and the screen shifted on a line parallel with one set of lines on the said screen with the same results.

The details of construction are so susceptible to variation that we do not wish to confine ourselves to the precise construction shown herein, but rather to avail ourselves of any modification that may fall properly within the scope of the invention.

Having thus described our invention, what we claim as new and desire to secure by Letters Patent is—

1. The combination with a photo-engraving camera, a screen having inclined lines thereon, and a plate holder, of inclined guideways secured to the front of the camera, said guideways being parallel with one set of lines on the screen; a lens slidably mounted within the guideways; a threaded screw operatively connected to the lens and to the front of the camera and arranged to shift the said lens in the guideways and on a line parallel with one set of lines on the screen; and means secured to the threaded screw and adapted to indicate the distance that the lens is shifted.

2. The combination with a photo-engraving camera, a screen having inclined lines thereon, and a plate holder, of inclined guideways secured to the front of the camera, said guideways being arranged parallel with one set of lines on the screen; a lens slidably mounted within the inclined guideways; a standard secured to the front of the camera; and a threaded screw rotatably mounted within the standard and operatively connected to the lens and adapted to shift the said lens within the said guideways, said screw being provided with a graduated knob whereby the amount of shift of the said lens may be determined.

3. The combination with a photo-engraving camera, a screen having two sets of inclined lines thereon, and a plate holder, of inclined guideways secured to the front of the camera and arranged parallel with one set of inclined lines on the screen; a lens slidably mounted within the guideways; a standard secured to the front of the camera; a threaded screw rotatably mounted within the standard and operatively connected to the lens whereby the said lens may be shifted on a line parallel with one set of lines on the screen, said threaded screw being provided with a graduated knob whereby the amount the lens is shifted may be determined; and means adapted to indicate the central or normal position of the lens.

4. The combination with a photo-engraving camera, a screen having sets of inclined lines thereon, a plate holder, of inclined guideways secured to the front of the camera and arranged parallel with one set of lines on the screen, one of said guideways having a graduation mark thereon; a plate slidably mounted within the guideways and having a central aperture and a graduation mark thereon arranged to register with the graduation mark on one of the guideways whereby the central position of the said plate may be determined; a lens secured within the central aperture in the plate; a standard secured to the front of the camera; and a threaded screw rotatably mounted within the standard and operatively connected to the plate whereby the said plate may be shifted within the guideways on a line parallel with one set of lines on the screen, said threaded screw being provided with a graduated knob whereby the amount of shift of the plate and the lens therein may be determined; and a second lens hingedly mounted upon one guideway and directly over the graduation thereon whereby the reading of the registration of the graduation marks on the said plate and guideway may be facilitated and a closer registration of said graduation marks thereby obtained.

In witness whereof, we have hereunto set our signatures in the presence of two subscribing witnesses.

FLETCHER V. WALSH.
COLVIN M. REED.

Witnesses:
 IRENE DOWNEY,
 D. B. RICHARDS.

Copies of this patent may be obtained for five cents each, by addressing the "Commissioner of Patents, Washington, D. C."